United States Patent
Hannosh et al.

(10) Patent No.: US 8,126,492 B2
(45) Date of Patent: Feb. 28, 2012

(54) VEHICLE COMMUNICATIONS SYSTEM

(75) Inventors: Sarmad Hannosh, West Linn, OR (US); Brian VanderPloeg, Lake Oswego, OR (US)

(73) Assignee: Sonetics Corporation, Portland, OR (US)

(*) Notice: Subject to any disclaimer, the term of this patent is extended or adjusted under 35 U.S.C. 154(b) by 329 days.

(21) Appl. No.: 12/567,377

(22) Filed: Sep. 25, 2009

(65) Prior Publication Data

US 2010/0087218 A1    Apr. 8, 2010

Related U.S. Application Data

(60) Provisional application No. 61/099,982, filed on Sep. 25, 2008.

(51) Int. Cl.
*H04Q 7/20* (2006.01)

(52) U.S. Cl. ........... 455/518; 455/519; 455/569.1; 455/569.2; 455/3.01; 455/3.04; 370/260; 370/261; 370/263; 370/328; 370/330

(58) Field of Classification Search ........... 455/518, 455/519, 500, 517, 569.1, 569.2, 575.2, 575.1, 455/3.01–3.06, 422.1, 403, 416, 414.1–414.4, 455/431, 550.1; 370/260, 261, 263, 328, 329, 330, 343, 347, 310
See application file for complete search history.

(56) References Cited

U.S. PATENT DOCUMENTS

| | | | |
|---|---|---|---|
| 6,223,062 B1 | 4/2001 | Davidson et al. | |
| 6,480,723 B1 | 11/2002 | Davidson et al. | |
| 7,433,717 B2 | 10/2008 | Wang et al. | |
| 7,493,140 B2 | 2/2009 | Michmerhuizen et al. | |
| 2003/0207694 A1* | 11/2003 | Legare et al. | 455/511 |
| 2007/0230709 A1* | 10/2007 | Wedge | 381/2 |
| 2009/0318076 A1* | 12/2009 | Awiszus | 455/3.05 |

* cited by examiner

*Primary Examiner* — Keith Ferguson
(74) *Attorney, Agent, or Firm* — Keith L. Jenkins, Registered Patent Attorney, LLC; Keith L. Jenkins

(57) ABSTRACT

The improved vehicle crew communication system provides an increase in the number of wireless headsets that can be used with one base station, an increase range from the vehicle for operation of said headsets, full duplex operation communication over digitally encrypted DECT protocol links from one base station to a plurality of headsets, pairing of each headset to a particular base station, use of wireless technology inside and outside of the vehicle, automatic channel and link selection to transparently avoid interfered-with channels and links, removal of the need to manually select a channel on the headset, and the combination of the noise-cancelling microphone with noise threshold, noise attenuation, and line echo cancellation tuned to intercom parameters.

20 Claims, 3 Drawing Sheets

VEHICLE COMMUNICATIONS SYSTEM

RELATED APPLICATIONS

This application claims the benefit of provisional application 61/099,982 filed Sep. 25, 2008 by the same inventors.

FIELD OF THE INVENTION

The present invention generally relates to a system for providing wireless communications between members of a vehicle crew, both inside the vehicle and outside the vehicle within 1000 feet of a particular point on the vehicle. Particular embodiments of the invention relate to emergency response vehicles, such as fire trucks and ambulances.

BACKGROUND OF THE INVENTION

Wired intercoms for communicating between crew members of vehicles are well known. U.S. Pat. No. 6,223,062 B1 for a COMMUNICATIONS INTERFACE ADAPTER issued to Davidson et al. on Apr. 24, 2001, discloses an interface between a vehicle intercom and a radio transceiver that allows a crew member who has disconnected from the wired intercom to access the wired intercom from outside the vehicle via radio transceiver through the communications interface adapter to the intercom.

While wired communications devices are less susceptible to interference, wireless communications enable greater freedom of action.

Accordingly, it is desirable to provide an improved vehicle crew communication system that is entirely wireless, resistant to interference, allows a plurality of disembarked crew members to communicate over the intercom at operationally useful distances, allows wireless communication within the vehicle, and avoids aggregating adapters to legacy systems. It is further desirable to have a vehicle crew communication system that permits intercom headset access to one or more radios for longer range communications.

BRIEF SUMMARY OF THE INVENTION

A system is provided for providing interference-resistant wireless communications for a vehicle crew both embarked in and disembarked from the vehicle. The system provides a five-channel base station (corresponding to five allocated channels in the 1.9 GHz band) able to communicate with up to 60 headsets by virtue of the twelve TDMA full-duplex slots in each channel. The bandwidth is sufficient to allow for digital encryption, thereby reducing the likelihood of interception during use in national security applications. Channel selection is performed automatically, using the DECT 6.0 protocol (or follow-on) in the US or DECT in Europe, so hand selection of channels, and errors made in that process, are avoided. Likewise, resistance to interference is enhanced by the use of DECT 6.0 (or follow-on) and DECT protocols. The combination of the communications system and the vehicle is within the scope of the invention.

An improved vehicle crew communications system including: a vehicle capable of carrying a crew, such crew including a plurality of human crew members who are users of the system; a base station coupled to the vehicle; an intercom communicatively coupled to the base station via a microphone input in the intercom and also communicatively coupled to a radio; a wireless headset wirelessly communicatively coupled via a wireless TDMA link to a particular base station; wherein the improvements comprise: increase in the number of the wireless headsets usable at once with one base station; increase in the distance from the vehicle at which a wireless headset is operable; full duplex communication over digitally encrypted DECT protocol links from one the base station; pairing of each particular headset of a wireless headset to a particular base station of a base station; wireless communications within and exterior to the vehicle; automatic slot and channel selection to avoid interference, wherein the selection is transparent to the users; removal of the need to manually select the channel for a wireless headset; and a noise-cancelling microphone with noise threshold, noise attenuation, and line echo cancellation tuned to parameters of the intercom.

The improved vehicle crew communications system, wherein a base station includes five or less base stations. The improved vehicle crew communications system, wherein a wireless headset includes four or less wireless headsets per base station. The improved vehicle crew communications system, wherein each base station of a base station provides five channels each having: twelve full-duplex TDMA links; a DECT protocol in the 1920-1930 MHz sub-band; a firmware digital signal processing algorithm for reducing line echo; and encryption. The improved vehicle crew communications system, wherein a particular wireless headset includes: a head-engaging web; a noise-canceling microphone coupled to the web; a microphone circuit coupled to the microphone, wherein the microphone circuit employs noise-gating; noise-reduction ear covers coupled to the web; a volume control switch; and a push-to-talk (PTT) switch. The improved vehicle crew communications system, wherein the microphone is automatically constantly on and the PTT switch provides access to a radio when the PTT switch is activated. The improved vehicle crew communications system, wherein the microphone is not automatically constantly on and the PTT is operable to switch the microphone to constantly on. The improved vehicle crew communications system, wherein the microphone is never constantly on and the PTT switch includes an off-biased button PTT switch operable to turn on the microphone only while the off-biased button PTT switch is depressed. The improved vehicle crew communications system, wherein the microphone circuit employs noise gating tuned to the microphone input of the intercom and further provides balancing of an audio level to allow the user's voice to break over the noise gate. The improved vehicle crew communications system, wherein the base station includes firmware including an adaptive digital signal processing algorithm to reduce side tone from a wireless headset. The improved vehicle crew communications system, wherein a wireless headset includes a rechargeable headset battery, the system further including a battery charger coupled to the vehicle for charging a rechargeable battery. The improved vehicle crew communications system, wherein a wireless headset includes a rechargeable headset, the system further including a charger coupled to the vehicle for charging a rechargeable headset.

An improved vehicle crew communications system including: a vehicle capable of carrying a crew, such crew including a plurality of human crew members who are users of the system; a base station coupled to the vehicle wherein each base station of a base station provides five channels each having: twelve full-duplex TDMA links; a DECT protocol in the 1920-1930 MHz sub-band; a firmware digital signal processing algorithm for reducing line echo; and encryption; an intercom communicatively coupled to a base station via a microphone input in the intercom and also communicatively coupled to a radio; a wireless headset wirelessly communicatively coupled via a TDMA link to a particular base station;

wherein the improvements comprise: increase in number of wireless headsets usable at once with one base station; increase in a distance from the vehicle at which a wireless headset is operable; full duplex communication over digitally encrypted DECT protocol links from one the base station; pairing of each particular headset to a particular base station; wireless communications within and exterior to the vehicle; automatic link and channel selection to avoid interference, wherein the selection is transparent to the users; removal of the need to manually select a channel for a wireless headset; and a noise-cancelling microphone with noise threshold, noise attenuation, and line echo cancellation tuned to parameters of the intercom. The improved vehicle crew communications system, including five or less base stations. The improved vehicle crew communications system, including four or less of the wireless headsets. The improved vehicle crew communications system, wherein the microphone is automatically constantly on and the PTT switch provides access to a radio when the PTT switch is activated. The improved vehicle crew communications system, wherein a particular wireless headset of a wireless headset includes: a noise-cancelling microphone; a microphone circuit coupled to the microphone, wherein the microphone circuit employs noise gating tuned to the microphone input of the intercom and further provides balancing of an audio level to allow the user's voice to break over the noise gate; noise-reduction ear covers; a volume control switch; and a push-to-talk (PTT) switch. The improved vehicle crew communications system, wherein a wireless headset includes a rechargeable headset battery, the system further including a battery charger coupled to the vehicle for charging a rechargeable headset battery. The improved vehicle crew communications system, wherein the base station includes firmware including an adaptive digital signal processing algorithm to reduce side tone from a wireless headset.

An improved vehicle crew communications system including: a vehicle capable of carrying a crew, such crew including a plurality of human crew members who are users of the system; a plurality of base stations coupled to the vehicle wherein: each base station of the plurality of base stations provides five channels each having: twelve full-duplex TDMA links; a DECT protocol in the 1920-1930 MHz subband; an adaptive DSP algorithm incorporated in firmware for attenuating side tones; and encryption; and the plurality of base stations includes no more than five base stations; an intercom communicatively coupled to: a base station of the plurality of base stations via a microphone input in the intercom, wherein: audio levels from the intercom to the base station are frequency and gain matched to the base station; and audio levels from the base station to the intercom are frequency and gain matched to the intercom; and a radio; four or fewer wireless headsets each wirelessly communicatively coupled via respective TDMA links to particular respective base stations of the plurality of base stations, wherein each the wireless headset includes: a head-engaging web; a noise-cancelling microphone coupled to the web; a microphone circuit coupled to the microphone; a pair of noise-reduction ear covers coupled to the web; a volume control switch coupled to one noise-reduction ear cover of the pair of the noise-reduction ear covers; a push-to-talk (PTT) switch coupled to one noise-reduction ear cover of the pair of the noise-reduction ear covers, wherein the PPT switch is operable to: access the radio; switch the microphone from off to continuously on; or switch the microphone from off to momentarily on; and wherein the improvements comprise: increase in numbers of wireless headsets usable at once with one base station; increase in a distance from the vehicle at which a wireless headset is operable; full duplex communication over digitally encrypted DECT protocol links from each the base station; pairing of each particular headset of a wireless headset to a particular base station; wireless communications within and exterior to the vehicle; automatic link and channel selection to avoid interference, wherein the selection is transparent to the users; removal of the need to manually select a channel for a wireless headset; and a noise-cancelling microphone with noise threshold, noise attenuation, and line echo cancellation tuned to parameters of the intercom.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

As used and defined herein, "DECT protocol" is interchangeable with "DECT 6.0 protocol" and also refers to compatible follow-on versions of DECT 6.0 protocol.

Figure 1:
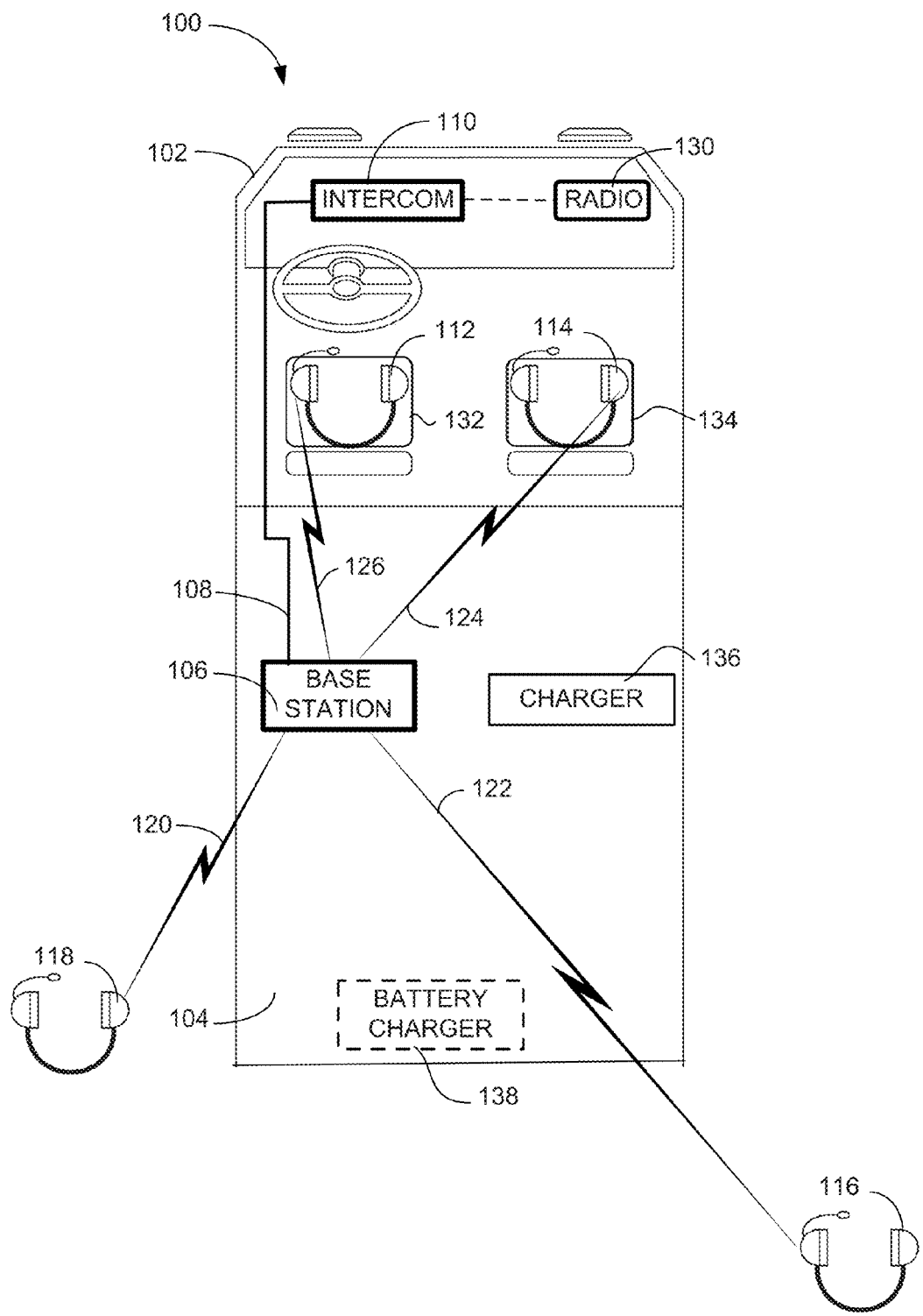
FIG. 1 is a diagrammatic view illustrating an exemplary improved vehicle crew communication system, according to an exemplary embodiment of the present invention.

FIG. 1 is a diagrammatic view illustrating an exemplary improved vehicle crew communication system 100, according to an exemplary embodiment of the present invention. Vehicle 102 is illustrated as a truck, but the invention is not so limited. For example, the vehicle may be, without limitation, a fire engine, an ambulance, or other emergency services vehicle, a crane, a boat, a mining truck, or an aircraft on a taxi-way. Wireless headsets 112, 114, 116, and 118 also represent users of such headsets, two of whom (112 and 114) are in the vehicle 102 and two of whom (116 and 118) are outside the vehicle 102. A base station 106 coupled to the vehicle 102 provides full duplex wireless links 120, 122, 124, and 126 to headsets 118, 116, 114, and 112, respectively.

Headsets 112, 114, 116, and 118 have a head-engaging web connecting two noise-reducing ear cups. Headsets 112, 114, 116, and 118 have push-to-talk (PTT) capability, provided by a button on an ear cup of each headset 112, 114, 116, or 118, and a microphone with volume control coupled to the head-engaging web. A preferred headset 112, 114, 116, or 118 has a constantly open headset microphone and uses the PTT switch to access the radio 130. A less preferred headset 112, 114, 116, or 118 has no radio 130 access and has an open microphone only when the PTT function is activated, preferably by depressing a button on an earpiece of the headset 112, 114, 116, or 118. In another alternate embodiment, for use where background noise is too high, the microphone may be activated by a PTT button. Each headset 112, 114, 116, and 118 has a noise cancelling microphone, noise reduction ear covers coupled to the web, and a volume control switch. The noise reduction ear covers include the ear cups, sound-damping foam inside the ear cup, and ear seals around the perimeters of the ear cups. The headset 112, 114, 116, or 118 may be designed variously for use under a helmet or hardhat or for use without a helmet. In an alternate embodiment, wireless links 120, 122, 124, and 126 may be half-duplex, using an alternate protocol and wireless platform.

The number of headsets 112, 114, 116, and 118 shown is not intended to limit the invention to four headsets 112, 114, 116, and 118, as will be further discussed below. Headsets 112, 114, 116, and 118 incorporate a noise-canceling microphone with a bidirectional (sometimes hyper-cardioid) pattern that cancel the far field sounds and amplify the near field sounds. Noise canceling microphones work better for low frequency noise rather than high frequency noise. In addition, the microphone circuits of headsets 112, 114, 116, and 118 employ noise gating. Noise gating means that a threshold is set for the microphone input level, below which everything is treated as noise and therefore is not passed through. Any sound has to be loud enough at near field from the microphone in order to get over the noise gate threshold. To be successful, noise gating requires setting the noise threshold and attenuation level in the headsets 112, 114, 116, and 118 to interact correctly with the respective noise gate parameters on the intercom's 110 microphone input. Another critical feature is the balancing of the audio level for the artificial side tone in order to create the correct psycho-acoustic feedback for the user in order to enable him to break over the noise gate consistently. Unbalanced noise-gating results in clipping off the first syllable(s) of words or having background noise overwhelm the conversation.

Inherent in the nature of the DECT 6.0 protocol is a significant delay associated with voice data processing. This delay is approximately 20 ms (10 ms one way) for a signal transmitted from the headset 112, 114, 116, or 118 to the base station 106 and into the intercom 110, looped through the intercom 110 and transmitted back by the base station 106 to the headset 112, 114, 116, or 118. This delay renders the true side tone (the side tone coming back from the intercom 110) on the headset 112, 114, 116, or 118 extremely echo ridden which causes a significant amount of user dissatisfaction during use. An adaptive DSP algorithm incorporated in the base station firmware called the LEC (Line Echo Canceller), with proper tuning and application-specific parameterization is preferred for reducing line echo. This is a rather sophisticated routine with many parameters that must be tuned just right in order to operate optimally. The function of the LEC is to eliminate (or severely attenuate) a particular wireless headset's side tone coming back from the intercom while preserving the audio coming from other wireless bases stations 105 and wired headsets 112, 114, 116, and 118 connected to other slots on the intercom. This means that the parameters of the LEC as well as the audio levels coming out and going into the base station have to be adjusted just right to match the frequency response and gain (transfer function) of the intercom 110 system in order to achieve a satisfactory echo suppression performance. At the point when the real side tone of the headset (in this case treated as echo by the base station) is eliminated, the artificial side tone on the headset is then enabled.

Base station 106 is coupled into intercom 110, which manages communications switching. Preferably, more than one base station 106 may be coupled to one intercom 110. For example, up to six base stations may be coupled to a Firecom™ 3020R intercom 110 manufactured by Sonetics Corporation of Portland, Oreg. In the present embodiment, each base station has five channels and up to five headsets may be "paired" to each base station. Preferably, no more than four headsets 112, 114, 116, and 118 are in use with one five-channel base station 106 at any given time. Multiple base stations 106 may be used with each intercom 110, allowing for a large number of headsets 112, 114, 116, and 118 per vehicle 102.

Optionally, at least one radio 130, for long-distance communication outside the vehicle 102, may be coupled to the intercom 110 to provide all users access to information arriving over the radio. For example, up to two radios 130 may be coupled to a Firecom™ 3020R intercom 110. Any user of headset 112, 114, 116, or 118 may communicate over radio 130 and one user may be assigned a priority radio transmission slot on the intercom 110 allowing priority transmission over the radio 130. In an alternate embodiment, the preferred slot for radio communication may be switchable. For example, while a fire truck is heading to a fire, the driver may be connected to radio 130. Once at the fire, the ranking fireman may be switched into the radio 130. When two radios 130 are coupled to intercom 110, a faceplate switch enables switching between radios. In an alternate embodiment, the radios 130 may be switched remotely via a switch on a headset 112, 114, 116, or 118.

Base station 106 is preferably attached to the vehicle in a high position that avoids proximity to metal in order to minimize interference between metal in the vehicle 102 and the wireless signals going to and from the base station 106. In a preferred embodiment, the vehicle 102 is designed to accommodate the base station 106 in a position where interference (including antenna pattern skew and RF attenuation) from metal surfaces and objects that are part of the vehicle 102 is minimal. For example, base station may be located high up on a front window of the vehicle 102. In another preferred embodiment, the base station 106 may be integral to (built into) the vehicle 102 in an advantageous position. In another embodiment, the vehicle 102 body may be made of a material that is at least partially transparent at the operating frequencies of the base station 106 and headsets 112, 114, 116, and 118. As an exemplary embodiment, the vehicle may have a vertical boom extending from a non-metallic vehicle 102 roof, (i.e. fiberglass), to maximize wireless coverage.

In a preferred embodiment, the vehicle 102 will have charging stations 136 for the wireless headsets 112, 114, 116, and 118, which is preferably by wires leading from the charger 136 to be plugged in to the headsets 112, 114, 116, and 118. Placement of charger 136 in FIG. 1 is not intended to be limiting. The headsets 112, 114, 116, and 118 preferably operate while charging. In an alternate embodiment, a rechargeable battery station 138 for recharging headset batteries is integral to the vehicle 102. Placement of battery charger 138 in FIG. 1 is not intended to be limiting.

Depending on the environment in which the vehicle 102 may be used, the vehicle 102 and headsets 112, 114, 116, and 118 are preferably made of materials that can withstand environmental influences such as heat, cold, rain, sea water spray, and the like. Further, the headsets 112, 114, 116, and 118 preferably comply with occupational safety regulations.

Figure 2:
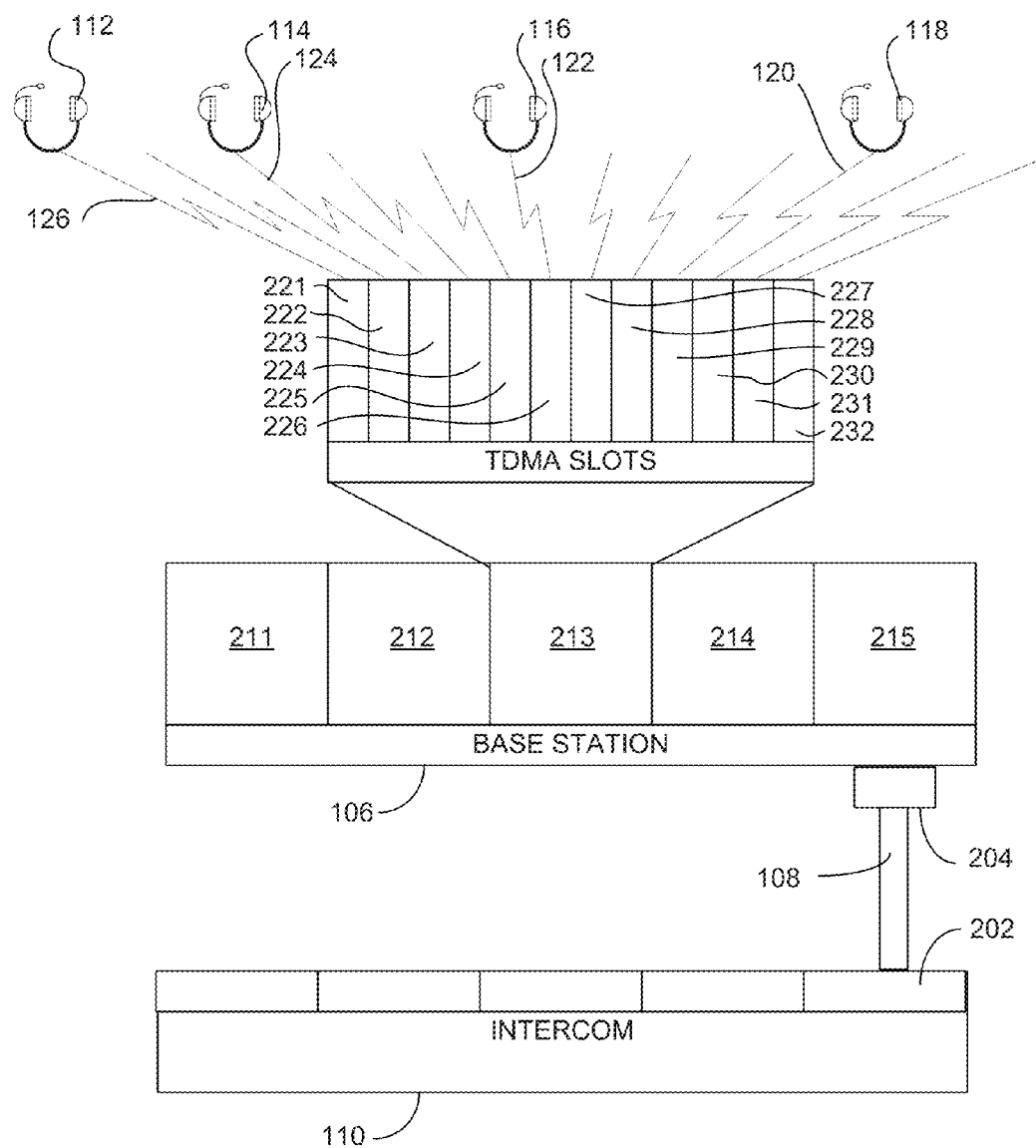
FIG. 2 is a diagrammatic view illustrating the exemplary channel and slot configuration of the TDMA embodiment of the present invention.

FIG. 2 is a diagrammatic view illustrating a snapshot of the exemplary channel 211-215 and slot 221-232 configuration of an exemplary embodiment of the present invention. The base station 106 preferably provides five channels 211, 212, 213, 214, and 215 in a DECT 6.0 protocol Unlicensed Personal Communications Services (UPCS) at 1920-1930 MHz sub-band. Each channel preferably provides twelve TDMA slots 221, 222, 223, 224, 225, 226, 227, 228, 229, 230, 231, and 232. This theoretically allows up to sixty headsets per base station 106, although sixty headsets is usually not operationally preferred. Each headset 112, 114, 116, 118, are paired to a particular base station 106 and cannot be used with other base stations 106 without reprogramming. Base station 106 is preferably coupled to intercom 110 through a connector 204, such as an RJ-12 connector 204. Intercom 110 may have multiple ports 202 (one labeled, five shown) for coupling in additional base stations 106 with additional headsets. Intercom 110 may also have a speaker with volume control (not shown).

Voice communications over wireless links 120, 122, 124, and 126 are digital and are encrypted to reduce the risk of interception and spoofing. The DECT 6.0 protocol detects which slot 221-232 in channels 211-215 has the lowest level of interference based on a preset Radio Signal Strength Indication (RSSI) and automatically switches to that particular slot in that particular channel 211-215. Keeping the number of headsets in use below sixty supports this capability: if every channel 211-215 is saturated, there are no available slots to switch to when interference is to be avoided. The switching between slots 221-232 and channels 211-215 during a given conversation is automatic and transparent to the user.

In other frequency bands, more than five channels may be available and a larger number of headsets may be supported by appropriately designed base stations 106.

Figure 3:
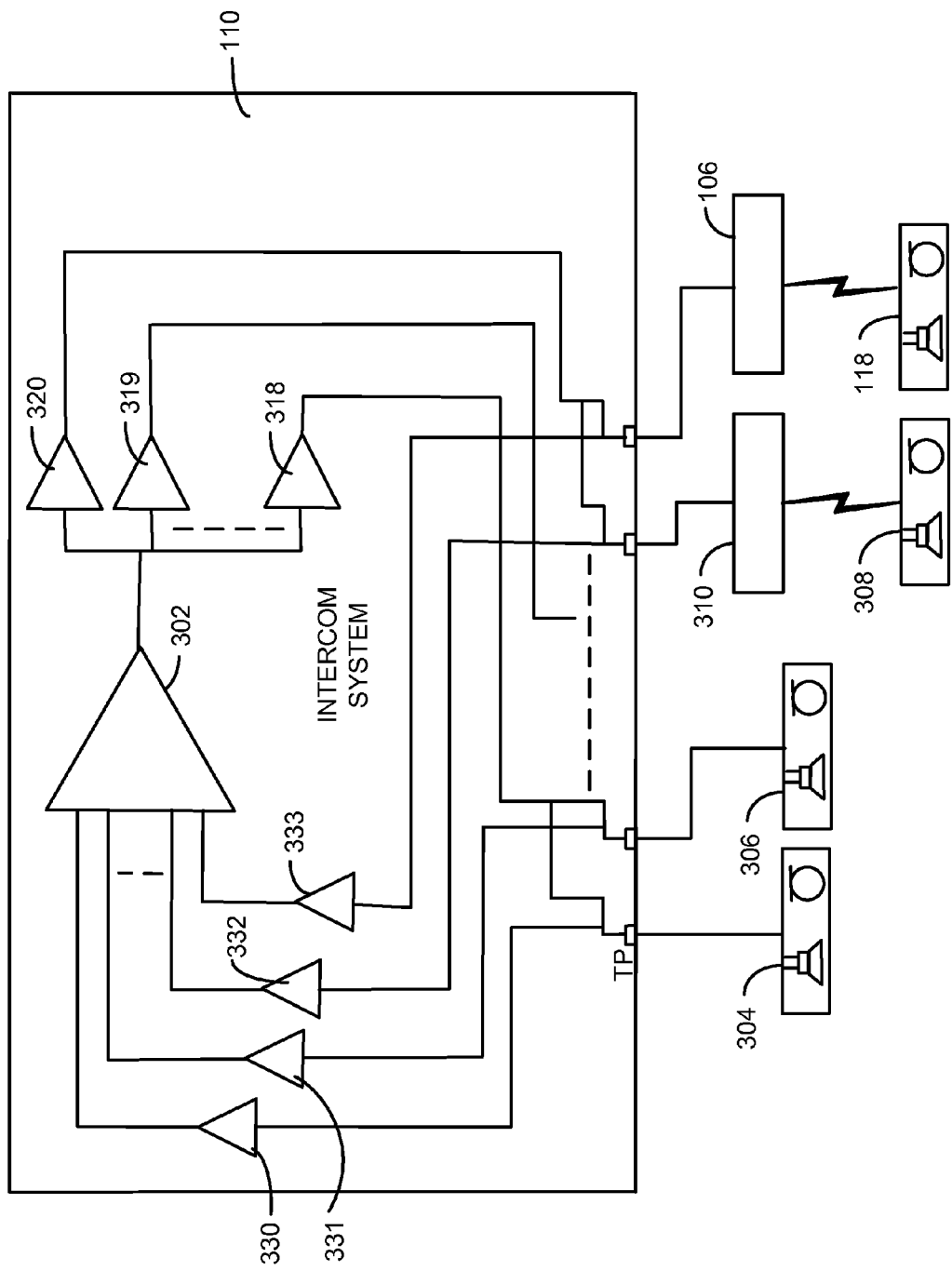
FIG. 3 is an electrical diagram for an intercom that may be used with the improved vehicle crew communications system, according to an exemplary embodiment of the present invention.

FIG. 3 is an electrical diagram for an intercom 110 that may be used with the improved vehicle crew communications system 100, according to an exemplary embodiment of the present invention. Headset 118 is wirelessly linked to multiple headset base station 106 which feeds the microphone audio through preamp 333 and then into summing amplifier 302. The output of summing amplifier 302 goes to audio amplifiers 318, 319, and 320. The output of audio amplifier 320 is coupled to multiple-headset base station 106 and transmitted wirelessly to headset 118 and also to single-headset base station 310 and transmitted wirelessly to headset 308. Audio amplifier 319 exemplifies an audio amplifier that supplies other audio loads (not shown) having impedance different from the base stations 310 and 106. Audio amplifier 318 supplies audio signals to wired headsets 304 and 306. Preamp 330 amplifies the microphone audio from wired headset 304 and feeds the amplified audio to summing amplifier 302. Preamp 331 amplifies the microphone audio from wired headset 306 and feeds the amplified audio to summing amplifier 302. Preamp 332 amplifies the microphone audio from single-headset base station 310 which received the microphone audio from headset 308 and feeds the amplified audio to summing amplifier 302. A plurality of multiple-headset base stations 106 may be connected with the addition of more audio amplifiers and preamps.

The improvements represented in the present invention include an increase in the number of headsets 112, 114, 116, and 118, an increase in range for the headsets 112, 114, 116, and 118, full duplex communication over digitally encrypted DECT 6.0 protocol links from one base station 106 to a plurality of headsets 112, 114, 116, and 118, pairing of headsets 112, 114, 116, and 118 with particular base stations 106, the use of only wireless technology for communications inside and within range of the vehicle, automatic channel selection to minimally-interfered-with channels, and removal of the need for manual channel selection in a wireless headset. Also, the combination of the noise-cancelling microphone with noise threshold, noise attenuation, and line echo cancellation tuned to intercom 110 parameters is regarded as novel.

Although applicant has described applicant's preferred embodiments of this invention, it will be understood that the broadest scope of this invention includes alternate embodiments such as those using diverse types of materials, circuits, and appliances that accomplish the same purpose in the same way. Such scope is limited only by the below claims as read in connection with the above specification. Further, many other advantages of applicant's invention will be apparent to those skilled in the art who are enlightened by the above descriptions and the below claims.

We claim:

1. An improved vehicle crew communications system comprising:
   a. a vehicle capable of carrying a crew, such crew comprising a plurality of human crew members who are users of said system;
   b. at least one base station coupled to said vehicle;
   c. an intercom communicatively coupled to said at least one base station via a microphone input in said intercom and also communicatively coupled to at least one radio;
   d. at least one wireless headset wirelessly communicatively coupled via a wireless TDMA link to a particular one base station of said at least one base station;
   e. wherein the improvements comprise:
      i. increase in number of said at least one wireless headset usable at once with one base station of said at least one base station;
      ii. increase in a distance from said vehicle at which said at least one wireless headset is operable;
      iii. full duplex communication over digitally encrypted DECT protocol links from one said base station;
      iv. pairing of each particular headset of said at least one wireless headset to a particular base station of said at least one base station;
      v. wireless communications within and exterior to said vehicle;
      vi. automatic slot and channel selection to avoid interference, wherein said selection is transparent to said users;
      vii. removal of the need to manually select the channel for said at least one wireless headset; and
      viii. a noise-cancelling microphone with noise threshold, noise attenuation, and line echo cancellation tuned to parameters of said intercom.

2. The improved vehicle crew communications system of claim 1, wherein said at least one base station comprises five or less base stations.

3. The improved vehicle crew communications system of claim 2, wherein said at least one wireless headset comprises four or less said wireless headsets per base station.

4. The improved vehicle crew communications system of claim 1, wherein each base station of said at least one base station provides five channels each having:
   a. twelve full-duplex TDMA links;
   b. a DECT protocol in the 1920-1930 MHz sub-band;
   c. a firmware digital signal processing algorithm for reducing line echo; and
   d. encryption.

5. The improved vehicle crew communications system of claim 1, wherein a particular said wireless headset of said at least one wireless headset comprises:
   a. a head-engaging web;
   b. a noise-canceling microphone coupled to said web;
   c. a microphone circuit coupled to said microphone, wherein said microphone circuit employs noise-gating;
   d. noise-reduction ear covers coupled to said web;
   e. a volume control switch; and
   f. a push-to-talk (PTT) switch.

6. The improved vehicle crew communications system of claim 5, wherein microphone is automatically constantly on and said PTT switch provides access to said at least one radio when said PTT switch is activated.

7. The improved vehicle crew communications system of claim 5, wherein microphone is not automatically constantly on and said PTT is operable to switch said microphone to constantly on.

8. The improved vehicle crew communications system of claim 5, wherein said microphone is never constantly on and said PTT switch comprises an off-biased button PTT switch operable to turn on said microphone only while said off-biased button PTT switch is depressed.

9. The improved vehicle crew communications system of claim 5, wherein said microphone circuit employs noise gating tuned to said microphone input of said intercom and further provides balancing of an audio level to allow the user's voice to break over said noise gate.

10. The improved vehicle crew communications system of claim 1, wherein said base station comprises firmware comprising an adaptive digital signal processing algorithm to reduce side tone from said at least one wireless headset.

11. The improved vehicle crew communications system of claim 1, wherein said at least one wireless headset comprises at least one rechargeable headset battery, the system further comprising a battery charger coupled to said vehicle for charging said at least one rechargeable battery.

12. The improved vehicle crew communications system of claim 1, wherein said at least one wireless headset comprises at least one rechargeable headset, the system further comprising a charger coupled to said vehicle for charging said at least one rechargeable headset.

13. An improved vehicle crew communications system comprising:
   a. a vehicle capable of carrying a crew, such crew comprising a plurality of human crew members who are users of said system;
   b. at least one base station coupled to said vehicle wherein each base station of said at least one base station provides five channels each having:
      i. twelve full-duplex TDMA links;
      ii. a DECT protocol in the 1920-1930 MHz sub-band;
      iii. a firmware digital signal processing algorithm for reducing line echo; and
      iv. encryption;
   c. an intercom communicatively coupled to said at least one base station via a microphone input in said intercom and also communicatively coupled to at least one radio;
   d. at least one wireless headset wirelessly communicatively coupled via a TDMA link to a particular one base station of said at least one base station;
   e. wherein the improvements comprise:
      i. increase in number of said at least one wireless headset usable at once with one base station of said at least one base station;
      ii. increase in a distance from said vehicle at which said at least one wireless headset is operable;
      iii. full duplex communication over digitally encrypted DECT 6.0 protocol links from one said base station;
      iv. pairing of each particular headset of said at least one wireless headset to a particular base station of said at least one base station;
      v. wireless communications within and exterior to said vehicle;
      vi. automatic link and channel selection to avoid interference, wherein said selection is transparent to said users;
      vii. removal of the need to manually select a channel for said at least one wireless headset; and
   f. a noise-cancelling microphone with noise threshold, noise attenuation, and line echo cancellation tuned to parameters of said intercom.

14. The improved vehicle crew communications system of claim 13, wherein said at least one base station comprises five or less base stations.

15. The improved vehicle crew communications system of claim 14, wherein said at least one wireless headset comprises four or less said wireless headsets.

16. The improved vehicle crew communications system of claim 13, wherein microphone is automatically constantly on and said PTT switch provides access to said at least one radio when said PTT switch is activated.

17. The improved vehicle crew communications system of claim 13, wherein a particular said wireless headset of said at least one wireless headset comprises:
   a. a noise-cancelling microphone;
   b. a microphone circuit coupled to said microphone, wherein said microphone circuit employs noise gating tuned to said microphone input of said intercom and further provides balancing of an audio level to allow the user's voice to break over said noise gate;
   c. noise reduction ear covers;
   d. a volume control switch; and
   e. a push-to-talk (PTT) switch.

18. The improved vehicle crew communications system of claim 13, wherein said at least one wireless headset comprises at least one rechargeable headset battery, the system further comprising a battery charger coupled to said vehicle for charging said at least one rechargeable headset battery.

19. The improved vehicle crew communications system of claim 13, wherein said base station comprises firmware comprising an adaptive digital signal processing algorithm to reduce side tone from said at least one wireless headset.

20. An improved vehicle crew communications system comprising:
   a. a vehicle capable of carrying a crew, such crew comprising a plurality of human crew members who are users of said system;
   b. a plurality of base stations coupled to said vehicle wherein:
      i. each base station of said plurality of base stations provides five channels each having:
         1. twelve full-duplex TDMA links;
         2. a DECT protocol in the 1920-1930 MHz sub-band;
         3. an adaptive DSP algorithm incorporated in firmware for attenuating side tones; and
         4. encryption; and
      ii. said plurality of base stations comprises no more than five base stations;
   g. an intercom communicatively coupled to:
      i. at least one base station of said plurality of base stations via a microphone input in said intercom, wherein:
         1. audio levels from said intercom to said base station are frequency and gain matched to said base station; and
         2. audio levels from said base station to said intercom are frequency and gain matched to said intercom; and
      ii. at least one radio;
   c. four or fewer wireless headsets each wirelessly communicatively coupled via respective TDMA links to particular respective base stations of said plurality of base stations, wherein each said wireless headset comprises:

i. a head-engaging web;
ii. a noise-cancelling microphone coupled to said web;
iii. a microphone circuit coupled to said microphone;
iv. a pair of noise-reduction ear covers coupled to said web;
v. a volume control switch coupled to one noise-reduction ear cover of said pair of said noise-reduction ear covers;
vi. a push-to-talk (PTT) switch coupled to one noise-reduction ear cover of said pair of said noise-reduction ear covers, wherein said PPT switch is operable to at least one of:
   1. access said radio;
   2. switch said microphone from off to continuously on; and
   3. switch said microphone from off to momentarily on; and
h. wherein the improvements comprise:
  i. increase in number of said at least one wireless headset usable at once with one base station of said plurality of base stations;
  ii. increase in a distance from said vehicle at which said at least one wireless headset is operable;
  iii. full duplex communication over digitally encrypted DECT protocol links from each said base station of said plurality of base stations;
  iv. pairing of each particular headset of said at least one wireless headset to a particular base station of said plurality of base stations;
  v. wireless communications within and exterior to said vehicle;
  vi. automatic link and channel selection to avoid interference, wherein said selection is transparent to said users;
  vii. removal of the need to manually select a channel for said at least one wireless headset; and
  viii. a noise-cancelling microphone with noise threshold, noise attenuation, and line echo cancellation tuned to parameters of said intercom.

\* \* \* \* \*